United States Patent [19]
Radlmann et al.
[11] 3,981,842
[45] Sept. 21, 1976

[54] SUBSTANTIALLY NON-INFLAMMABLE ACRYLONITRILE POLYMERS CONTAINING ANTIMONY SALTS

[75] Inventors: Eduard Radlmann, Dormagen-Hackenbroich; Heinz Schaffner, Dormagen; Günter Lorenz, Dormagen; Günther Nischk, Dormagen, all of Germany

[73] Assignee: Bayer Aktiengesellschaft, Leverkusen, Germany

[22] Filed: May 8, 1975

[21] Appl. No.: 575,591

[30] Foreign Application Priority Data

May 8, 1974 Germany ........................ 2422171

[52] U.S. Cl. ........................ 260/45.75 B
[51] Int. Cl.[2] ........................ C08J 3/20
[58] Field of Search ........................ 260/45.75 B, 446

[56] References Cited

UNITED STATES PATENTS

| | | | |
|---|---|---|---|
| 3,359,218 | 12/1967 | Wiles | 260/446 |
| 3,417,115 | 12/1968 | Stamm | 260/446 |
| 3,437,591 | 4/1969 | Bungs | 260/446 |
| 3,657,179 | 4/1972 | Yates | 260/446 |
| 3,705,128 | 12/1972 | Knowles | 260/45.75 B |
| 3,732,182 | 5/1973 | Chimura et al. | 260/446 |

FOREIGN PATENTS OR APPLICATIONS

| | | |
|---|---|---|
| 734,483 | 5/1966 | Canada |

*Primary Examiner*—V. P. Hoke
*Attorney, Agent, or Firm*—Plumley and Tyner

[57] ABSTRACT

The invention relates to flame-proof copolymers of acrylonitrile and vinyl or vinylidene halide which contain from 0.1 to 5 % by weight of antimony in form of a water-insoluble amide-group containing antimony complex compound.

5 Claims, No Drawings

SUBSTANTIALLY NON-INFLAMMABLE ACRYLONITRILE POLYMERS CONTAINING ANTIMONY SALTS

This invention relates to acrylonitrile and vinyl and/or vinylidene halide copolymers which, through the additional incorporation of special complex antimony compounds, can be used to produce substantially non-inflammable shaped articles. More particularly, the invention relates to self-extinguishing textile filaments, which after processing into knitted articles of filaments and fibre yarn, withstand without exception the vertical burning test according to DIN 53 906.

It is known that the inflammability and burning properties of polyacrylonitrile are reduced by copolymerising acrylonitrile with halogen-containing comonomers such as, for example, vinyl or vinylidene chloride. However, the quantity of halogen-containing comonomers is limited on account of the no longer satisfactory technological data of shaped articles produced from them. In the rarest cases, therefore, the vinyl or vinylidene content is greater than 45% by weight. Fibres of copolymers of this kind only withstand the vertical burning test according to DIN 53 906 with certain limitations. The need for a further improvement in noninflammability i.e. for safe passing of the test, is of considerable significance. Halogen-containing substrates, in conjunction with antimony, are known to have a synergistic effect upon the substantial non-inflammability of polymers. For example, it is known that insoluble antimony compounds, such as antimony oxide or antimony sulphide, can be introduced into polymers in order to obtain improved flameproof properties. The disadvantages of antimony compounds of this kind are, on the one hand, their insolubility and the difficulties which this causes, such as the fouling of spinnerets and filters where the polymers are processed from solutions, and, on the other hand, the reduction in gloss which fibres or films undergo as a result of pigmentation of these coarsely disperse particles. In addition, the flammproofing effect is governed by the surface size of the particles.

In order to eliminate the problem of the substantial insolubility of antimony compounds, soluble antimony (III)-tartaric acid complexes have been proposed as flameproofing additives to polymers to U.S. Pat. No. 3,728,367, whilst soluble antimony (V)-$\alpha$-hydroxy carboxylic acid complexes have been proposed for the same purpose in German Offenlegungsschrift No. 2,159,174. Both types of compounds are produced from the corresponding antimony halides, and halogen-free and halogen-containing complexes can be formed. The major disadvantage of the halogen-free complexes in their outstanding solubility in water, as a result of which a considerable proportion of the active antimony compound migrates into the aqueous phase and, hence, becomes inactive during the usual aqueous aftertreatments to which shaped articles, such as films and fibres, are subjected. The disadvantage of the halogen-containing complexes is their ready hydrolysability resulting in the formation of antimony oxide, which is insoluble in organic solvents, and in addition hydrogen halide which gives rise to undesirable corrosion of iron-containing apparatus.

Accordingly, there is a need for antimony-containing flameproofing agents which, before the spinning of fibres or the casting of films of acrylonitrile/vinyl or vinylidene halide copolymers, which may be added to the corresponding polymer solutions in polar organic solvents without any incompatibility phenomena, which are insoluble or substantially insoluble in water and, hence, remain quantitatively in the shaped articles, which do not give rise to any corrosion problems and, which in addition, do not adversely affect the physical properties of the products.

It has now been found that water-insoluble complex $\alpha$-hydroxy carboxylic acid/antimony compounds containing amide groups can be added without incompatibility phenomena to solutions of acrylonitrile and vinyl or vinylidene halide copolymers in polar solvents, for example dimethyl formamide, that the solutions can be further processed into filaments without furthermore giving rise to any corrosion in the solution containers, pipes, filter presses and spinning units, and that filaments produced therefrom following the usual aqueous aftertreatments, such as stretching and washing, have substantially the original antimony content by virture of the insolubility of the additives in water and withstand the vertical burning test according to DIN 53 906 without exception by virtue of the synergistic effect of the antimony.

Accordingly, the invention relates to a composition of matter which comprises a copolymer of acrylonitrile and a member selected from the group consisting of vinyl halide, vinylidene halide and a mixture thereof and from 0.1 to 5% by weight based on the total mixture of antimony in the form of a water-insoluble complex antimony compound containing at least one amide group which compound is formed by reacting an antimony oxide with an excess of an $\alpha$-hydroxy carboxylic acid in a polar organic solvent at a temperature in the range of from 100° to 200°C, and reacting the resulting reaction product with the stoichiometric quantity of a monoisocyanate at a temperature below 100°C.

The invention relates further to a process for producing a composition of matter of the kind claimed in claims 1 to 5, wherein a solution of the complex antimony compound is initially prepared by reacting an antimony oxide with an excess of an $\alpha$-hydroxy carboxylic acid in a polar organic solvent at temperatures in the range of from 100° to 200° C, and reacting the resulting reaction product with the stoichiometric quantity of a monoisocyanate at temperatures below 100° C, the resulting solution of the complex antimony compound is intimately mixed with a solution of the copolymer and the solvent is optionally removed.

The invention also relates to shaped articles of these compositions.

The complex antimony compounds added in accordance with the invention may be prepared as follows:

Antimony (III) or (V) oxide is heated under nitrogen at a temperature of from 100° to 200°C, preferably from 100° to 180°C, with an $\alpha$-hydroxy carboxylic acid in a molar ratio of 1:2 to 1:4 (ratio of Sb to $\alpha$-hydroxy carboxylic acid) in the presence of from 30 to 100% by weight of a polar organic solvent, accompanied by the elimination of water, until a clear solution is formed. The solution is then cooled to temperature below 100°C, diluted with more polar solvent (depending upon the application invisaged) and the stoichiometric quantity (based on the free carboxyl groups) of a monoisocyanate added. Carbonamide groups are formed, their formation being accompanied by the evolution of carbon dioxide. The solutions obtained are colourless to pale yellow in colour and may be used as polymer additives as such, i.e. without any need for further purification. If the solvent is removed by distillation a substantially colourless solid residue is left.

Suitable $\alpha$-hydroxy carboxylic acids are, for example, tartaric acid, malic acid, lactic acid, glycolic acid, citric acid, mucic acid and glyceric acid. Tartaric acid, malic acid and lactic acid are preferably used.

Suitable monoisocyanates are compounds corresponding to the general formula R—N=C=O, where R is a linear or branched alkyl radical with from 1 to 20 carbon atoms, or the radical:

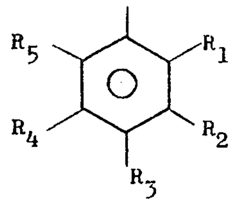

in which $R_1$, $R_2$, $R_3$, $R_4$ and $R_5$, which may be identical or different, may represent hydrogen, an alkyl radical with from 1 to 5 carbon atoms or fluorine, chlorine or bromine.

Suitable polar organic solvents include formamide, monomethyl formamide, dimethyl formamide, acetamide, monomethyl acetamide, dimethyl acetamide, tetramethyl urea N-methyl pyrrolidone and dimethyl sulphoxide. Dimethyl formamide and dimethyl acetamide are particularly preferred solvents.

According to the invention, copolymers to which the flameproofing complex antimony compound is added include copolymers of acrylonitrile, vinyl or vinylidene halides preferably vinyl chloride or vinylidene chloride and, optionally, copolymerisable compounds which provide an improvement in the affinity of the polymers for acid or basic dyes.

Particularly suitable polymers are polymers containing at least 40% by weight of acrylonitrile and up to 60% by weight of at least one vinyl halide.

Compounds which improve affinity for dyes are generally known.

The following compounds are particularly preferred: vinyl-, allyl-, styrene- and methallyl sulphonic acid, acryloyl amidobenzene benzene disulphimide and sodium salts thereof.

The compositions according to the invention are prepared by mixing the solutions of the complex antimony compounds with solutions of the acrylonitrile polymers and optionally removing the solvent.

In many cases, it is best to process the resulting solution of complex and polymer into shaped articles directly, i.e. without intermediate isolation of the flameproof copolymer.

The solvents used are the solvents preferably used for the production of the antimony complexes.

Fibres produced from solutions mixtures of this kind by conventional dry or wet spinning processes may readily be processed into textile materials with a variety of different weights per unit area. The materials have a high gloss level and without exception pass the vertical burning test according to DIN 53 906. In other words, they are self-extinguishing.

The following Examples are to further illustrate the invention without limiting it.

EXAMPLE 1 (Solution A)

150 parts by weight of tartaric acid are dissolved at around 100°C in 600 parts by weight of dimethyl formamide. Following the addition of 72.9 parts by weight of antimony trioxide, the temperature is increased with stirring to 150°C while nitrogen is passed over. Under these conditions, a clear solution is formed after about 35 minutes during which water distills off. After cooling to 20°C another 600 parts by weight of dimethyl formamide are added and phenyl isocyanate is added dropwise to the almost colourless solution at 20° to 40°C until there is no further evolution of carbon dioxide. 136.5 parts by weight are required to that end. The reaction mixture is then stirred at 40°C for 2 hours, during which a slight deposit may form, although it is completely dissolved again on admixture with an acrylonitrile and vinyl or vinylidene chloride copolymer. The molar ratio of tartaric acid to antimony is 2:1. Whereas antimony/tartaric acid complexes are soluble in water, the product precipitates when water is added to it.

EXAMPLE 2 (Solution B)

750 parts by weight of tartaric acid and 364 parts by weight of antimony trioxide, together with 400 parts by weight of dimethyl formamide, are heated with stirring to 150°C over a period of about 30 minutes, during which nitrogen is passed over and water is distilled off, until a clear solution is formed. The resulting solution is then diluted with another 1500 parts by weight of dimethyl formamide, cooled to 25°C and a solution of 290 parts by weight of methyl isocyanate in 500 parts by weight of dimethyl formamide is added dropwise in such a way that the temperature does not exceed 40°C. The evolution of $CO_2$ stops after a little more isocyanate is added. The reaction mixture is then stirred for 1.5 hours at 40°C. A small deposit may crystallise out of the colourless solution in the event of prolonged standing, although it disappears completely on admixture with an acrylonitrile-vinyl chloride copolymer solution in dimethyl formamide. The addition of water to the solution of the complex antimony compound causes the compound to precipitate.

EXAMPLE 3 (Solution C)

364.3 parts by weight of antimony trioxide and 400 parts by weight of dimethyl acetamide, together with 825 parts by weight of tartaric acid, are heated with stirring to 155°C over a period of 40 minutes, during which nitrogen is passed over and water is distilled off, until a clear melt is obtained. The melt is then diluted with another 2000 parts by weight of dimethyl acetamide, cooled to 20°C and 1128 parts by weight of 3,4-dichlorophenyl isocyanate are added in portions, so that the temperature does not exceed 40°C. The evolution of $CO_2$ stops after the above-mentioned quantity of isocyanate has been added. The almost colourless solution is then stirred for 3 hours at 40°C. Any deposit which may form dissolves completely on admixture with an acrylonitrile/vinylidene chloride copolymer solution in dimethyl acetamide.

EXAMPLE 4 (Solution D)

670 parts by weight of malic acid, 364.3 parts by weight of antimony trioxide and 500 parts by weight of dimethyl formamide are heated with stirring to 150°C. Water distils off until a clear solution is formed. The solution is then diluted with 1800 parts by weight of dimethyl formamide, cooled to 20°C and n-butyl isocyanate is added in portions at 20° to 40°C until the evolution of $CO_2$ stops. 499 parts by weight of isocyanate are consumed. The solution formed is only the palest yellow in colour and is stirred for 2 hours at 40°C. Any deposit which may form is completely redissolved when the solution is added to a copolymer solution in dimethyl formamide. The complex antimony compound is insoluble in water.

EXAMPLE 5

The complex antimony solutions A, B, C and D described in Examples 1 to 4 are added in various quantities to a 35% dimethyl formamide solution or an acrylonitrile/vinylidene chloride copolymer (composition: 58.6% of acrylonitrile, 38.5% vinylidene chloride and 2.9% of sodium methylallyl sulphonate) with a K-value (according to Fikentscher) of 74. The polymer solutions with the additions are then dry-spun into filaments by known methods. The filaments thus produced are stretched in hot water and washed in the usual way.

The results of burning tests (vertical burning test as specified in DIN 53 906) carried out on pieces of fibre-yarn knitting are set out in the following Table:

Table 1

| Solution Added | Antimony Content [%] added | Antimony Content [%] Found in piece of knitting | Vertical burning test according to DIN 53906: Ignition time secs. | Burning time * secs. | Length burnt [cm] max 35 cm |
|---|---|---|---|---|---|
| | | | 3 | 48 | 32.5 |
| | | | 3 | 29 | 32.5 |
| — | 0 | 0 | 3 | 27 | 20.0 |
| Comparison test without any addition | | | 15 | 25 | 32.5 |
| | | | 15 | 27 | 32.5 |
| | | | 15 | 26 | 32.5 |
| | | | 3 | 12 | 11.0 |
| | | | 3 | 15 | 11.5 |
| A | 0.5 | 0.4 | 3 | 17 | 9.0 |
| | | | 15 | 22 | 12.0 |
| | | | 15 | 15 | 14.5 |
| | | | 15 | 18 | 13.5 |
| | | | 3 | — | 4.5 |
| | | | 3 | — | 5.0 |
| A | 1.0 | 0.9 | 3 | 2 | 4.0 |
| | | | 15 | — | 10.0 |
| | | | 15 | 2 | 11.5 |
| | | | 15 | 5 | 13.0 |
| | | | 3 | — | 2.0 |
| | | | 3 | — | 1.0 |
| A | 1.5 | 1.5 | 3 | — | 1.5 |
| | | | 15 | — | 3.5 |
| | | | 15 | 1 | 3.0 |
| | | | 15 | — | 3.0 |
| | | | 3 | — | 1.0 |
| | | | 3 | — | 2.0 |
| B | 1.5 | 1.4 | 3 | — | 1.0 |
| | | | 15 | 1 | 3.0 |
| | | | 15 | — | 3.5 |
| | | | 15 | — | 3.0 |
| | | | 3 | — | 1.0 |
| | | | 3 | — | 1.0 |
| C | 1.8 | 1.6 | 3 | — | 1.5 |
| | | | 15 | — | 1.0 |
| | | | 15 | — | 1.5 |
| | | | 15 | — | 2.0 |
| | | | 3 | 1 | 2.0 |
| | | | 3 | 2 | 1.0 |
| D | 1.5 | 1.5 | 3 | — | 1.0 |
| | | | 15 | — | 3.0 |
| | | | 15 | — | 3.0 |
| | | | 15 | 1 | 3.0 |

* following removal of the ignition flame

EXAMPLE 6

The complex antimony solutions A to D described in Examples 1 to 4 are added in various quantities to a 27% dimethyl acetamide solution of an acrylonitrile/vinyl chloride copolymer (compositions: 54.8% of acrylonitrile 42.4% of vinyl chloride and 2.8% of sodium methallyl sulphonate) with a K-value (according to Fikentscher) of 77.7. The resulting polymer solutions are dry-spun into filaments and the filaments are stretched in hot water and subsequently washed in the usual way. The filaments are then processed into fibre yarn. Pieces of knitting produced from this fibre yarn are subjected to the vertical burning test according to DIN 53 906.

The results are set out in Table 2:

Table 2

| Solution Added | Antimony Content [%] added | Antimony Content [%] Found in piece of knitting | Vertical burning test according to DIN 53906: Ignition time secs. | Burning time * secs. | Length burnt [cm] max 35 cm |
|---|---|---|---|---|---|
| | | | 3 | 25 | 31.0 |
| | | | 3 | 28 | 31.5 |
| — | 0 | 0 | 3 | 25 | 31.0 |
| Comparison test without any addition | | | | | |
| | | | 15 | 24 | 32.0 |
| | | | 15 | 25 | 28.5 |
| | | | 15 | 24 | 31.0 |
| | | | 3 | — | 1.0 |
| | | | 3 | — | 1.5 |
| A | 1.5 | 1.4 | 3 | 1 | 1.0 |
| | | | 15 | — | 3.0 |
| | | | 15 | — | 2.0 |
| | | | 15 | — | 3.0 |
| | | | 3 | 7 | 10.0 |
| | | | 3 | 6 | 12.5 |
| B | 0.5 | 0.5 | 3 | 8 | 12.0 |
| | | | 15 | 12 | 11.0 |
| | | | 15 | 12 | 13.0 |
| | | | 15 | 7 | 10.5 |
| | | | 3 | — | 3.0 |
| | | | 3 | 1 | 3.5 |
| B | 1.0 | 0.9 | 3 | 1 | 3.5 |
| | | | 15 | — | 4.5 |
| | | | 15 | — | 8.0 |
| | | | 15 | 2 | 8.5 |
| | | | 3 | — | 2.0 |
| | | | 3 | — | 2.0 |
| B | 2.0 | 1.9 | 3 | — | 1.5 |
| | | | 15 | — | 2.0 |
| | | | 15 | — | 2.5 |
| | | | 15 | — | 1.5 |
| | | | 3 | — | 2.0 |
| | | | 3 | 1 | 3.0 |
| C | 1.7 | 1.7 | 3 | — | 2.0 |
| | | | 15 | — | 2.0 |
| | | | 15 | — | 2.5 |
| | | | 15 | — | 2.5 |
| | | | 3 | — | 1.5 |
| | | | 3 | — | 1.5 |
| D | 2.5 | 2.3 | 3 | — | 2.0 |
| | | | 15 | — | 2.0 |
| | | | 15 | — | 2.5 |
| | | | 15 | — | 1.0 |

* following removal of the ignition flame

We claim:

1. A composition of matter which comprises a copolymer of acrylonitrile and a member selected from the group consisting of vinyl halide, vinylidene halide and a mixture thereof and from 0.1 to 5% by weight based on the total mixture of antimony in the form of a water-insoluble complex antimony compound containing at least one amide group which compound is formed by reacting an antimony oxide of Sb to acid in a molar ratio of 1:2 to 1:4 with an $\alpha$-hydroxy carboxylic acid selected from the group consisting of tartaric acid, malic acid, lactic acid, glycolic acid, citric acid, mucic acid and glyceric acid in a polar organic solvent at a temperature in the range of from 100 to 200°C, and reacting the resulting reaction product with the stoichiometric quantity of a monoisocyanate at a temperature below 100°C, said monoisocyanate corresponding to the general formula R—N=C=O, wherein R is a linear or branched alkyl radical with from 1 to 20 carbon atoms, or represents the radical:

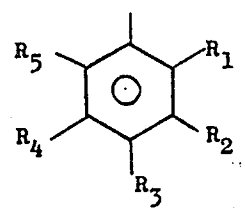

in which $R_1$, $R_2$, $R_3$, $R_4$ and $R_5$ which may be identical or different, represent a member selected from the group consisting of hydrogen, an alkyl radical with from 1 to 5 carbon atoms, fluorine, chlorine and bromine.

2. The composition of claim 1, wherein said copolymer comprises at least 40% by weight of acrylonitrile and up to 60% by weight of a member selected from the group consisting of vinyl halide, vinylidene halide and a mixture thereof.

3. A shaped article of a composition of the kind claimed in claim 1.

4. The composition of claim 1, wherein said copolymer contains at least one additional material selected from the group of a monomer, monomers with at least one acid or basic group in copolymerised form.

5. A process for producing a composition of matter of the kind claimed in claim 1, wherein a solution of the complex antimony compound is initially prepared by reacting an antimony oxide with an excess of an α-hydroxy carboxylic acid selected from the group consisting of tartaric acid, malic acid, lactic acid, glycolic acid, citric acid, mucic acid and glyceric acid, in a polar organic solvent at temperatures in the range of from 100 to 200°C, and in a molar ratio of Sb to acid of 1:2 to 1:4 and reacting the resulting reaction product with the stoichiometric quantity of a monoisocyanate at temperatures below 100°C., said monoisocyanate corresponding to the general formula R—N=C=O, wherein R is a linear or branched alkyl radical with from 1 to 20 carbon atoms, or represents the radical:

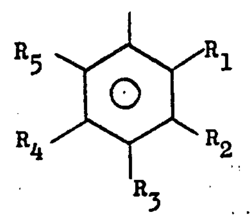

in which $R_1$, $R_2$, $R_3$, $R_4$ and $R_5$ which may be identical or different, represent a member selected from the group consisting of hydrogen, an alkyl radical with from 1 to 5 carbon atoms, fluorine, chlorine and bromine, the resulting solution of the complex antimony compound is intimately mixed with a solution of the copolymer and the solvent is optionally removed.

* * * * *

UNITED STATES PATENT OFFICE

CERTIFICATE OF CORRECTION

Patent No. 3,981,842 Dated September 21, 1976

Inventor(s) Eduard Radlmann et al.

It is certified that error appears in the above-identified patent and that said Letters Patent are hereby corrected as shown below:

Column 2, line 61, "temperature" should read -- temperatures --.

Column 4, line 14, after "dioxide" there should be a new paragraph starting with --- 136.5 parts ---.

Signed and Sealed this

Seventh Day of June 1977

[SEAL]

*Attest:*

RUTH C. MASON
*Attesting Officer*

C. MARSHALL DANN
*Commissioner of Patents and Trademarks*